No. 710,744. Patented Oct. 7, 1902.
L. J. BORDO.
PLUG COCK.
(Application filed Nov. 21, 1899.)
(No Model.)
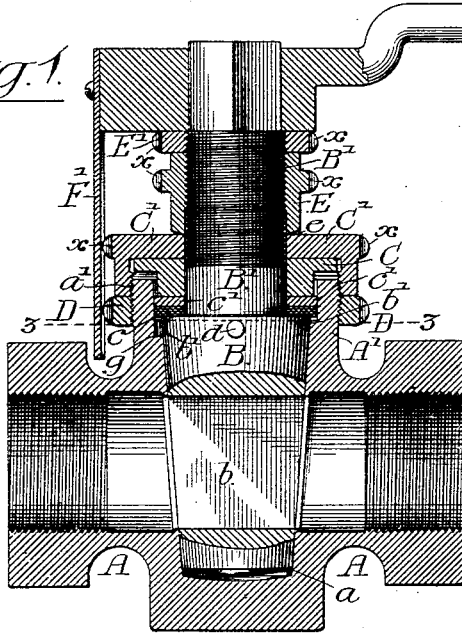
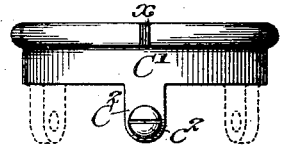
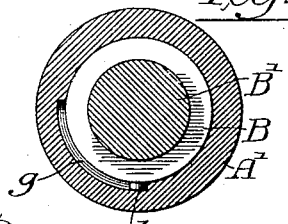
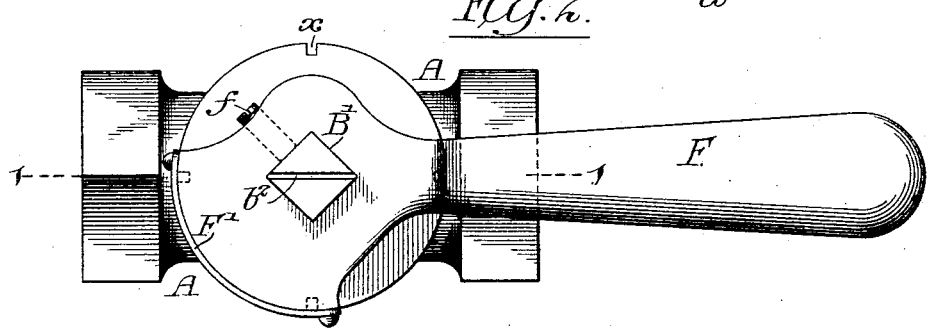
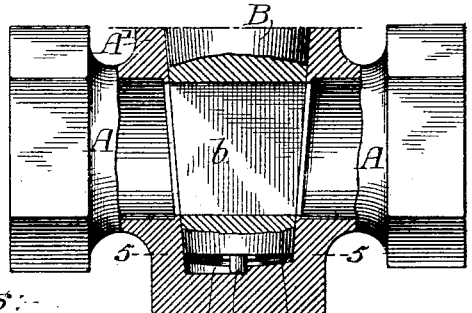
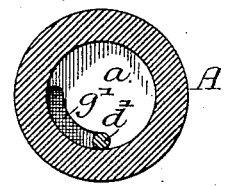
Witnesses:
Charles DeBow
Louis M. T. Whitehead
Inventor:—
Lambert J. Bordo.
by his Attorneys:—
Howson & Howson

UNITED STATES PATENT OFFICE.

LAMBERT J. BORDO, OF PHILADELPHIA, PENNSYLVANIA.

PLUG-COCK.

SPECIFICATION forming part of Letters Patent No. 710,744, dated October 7, 1902.

Application filed November 21, 1899. Serial No. 737,778. (No model.)

*To all whom it may concern:*

Be it known that I, LAMBERT J. BORDO, a citizen of the United States, residing in Philadelphia, Pennsylvania, have invented certain Improvements in Plug-Cocks, of which the following is a specification.

My invention consists of an improved plug-cock particularly adapted for controlling water, air, gas, or steam pressure, or the flow of highly-volatile fluids, where it is absolutely necessary that a perfectly-tight fit of plug and casing shall be maintained and yet easy movement of the plug to open or close the cock shall be permitted.

My improved plug-cock is of such construction that the plug cannot be jammed in its seat by blows on the stem and is therefore operative at all times. It is also provided with means for raising the plug from its seat in the casing should the plug become set from any cause.

My invention also includes means for opening and closing the cock, a gage or indicator being combined with such means, whereby the position of the opening in the plug with relation to the passage through the casing may always be known.

My invention is fully illustrated in the accompanying drawings, in which—

Figure 1 is a view of my improved plug-cock, partly in elevation and partly in section, on the line 1 1, Fig. 2. Fig. 2 is a plan view of my improved plug-cock and its operating-lever. Fig. 3 is a sectional plan view of the plug and casing, taken on the line 3 3, Fig. 1. Fig. 4 is a view of a modification of a part of my invention. Fig. 5 is a sectional plan view taken on the line 5 5, Fig. 4; and Fig. 6 is a view showing a special form of one of the parts of my improved plug-cock.

In the drawings, A is the casing of the cock, and B the plug forming the valve. The plug has an opening $b$ extending through the same, and in the drawings the cock is shown open. The plug B is tapered, ground true, and fits the tapered ground socket or seat $a$ in the valve-casing A and is reduced in diameter at the larger end, forming the stem B' and a shoulder $b'$. Bearing on the shoulder $b'$ of the plug is a washer $c$, preferably of asbestos, fitting an annular recess in the top of the valve-casing A. On the top of the asbestos washer is placed a metal wearing-ring $c'$, and on top of this ring is a compression-ring C. When these parts are fitted in place, a screw-cap C', adapted to threads $a'$ on the neck A' of the casing, is screwed down, forcing the compression-ring C against the wearing-ring $c'$, such action binding the washer $c$ between the shoulder $b'$ of the plug and the wearing-ring $c'$ and making the plug fit absolutely tight, yet not binding it in its seat, because of the comparatively elastic ring $c$. To prevent accidental movement of the screw-cap C' when the cock is opened or closed, a lock-nut D is adapted to the threaded neck of the casing below the said cap C'.

Instead of using the nut D for locking the cap C' when the latter is adjusted, this cap may be provided with depending ears $C^2$, affording supports for set-screws $c^2$, by means of which the cap C' may be secured to the neck A' of the casing when adjusted. A single depending ear may be employed, or I may use a number of ears set at equidistant points around the cap C'. In Fig. 6 I have shown this cap provided with such ears, two of which are shown in dotted lines.

To prevent the jamming of the plug B in its seat from a blow on the stem B' of the same, I thread this stem and arrange on such threaded portion two nuts E and E'. The nut E is longer than the nut E' and is threaded for a portion of its length only and has a rounded lower edge $e$, which is normally almost in contact with the top of the cap C', so that while it is not liable to become unscrewed by frictional contact with the cap C' it prevents any downward movement of the plug B. To secure the nut E firmly in place after it has been adjusted, I provide the lock-nut E'. The use of the nuts E and E' will effectually prevent the jamming of the plug B in its seat in the casing, as any blow on the end of the stem B', either intentionally with a view of tightening the plug in its seat or from any accident, will be taken up by the nuts E and E', threaded to the stem B', and transmitted to the casing through the cap C'. The nut E further provides for the lifting of the plug from its seat should it become corroded therein from non-use or stuck from any other cause. This lifting may be accomplished in the following manner: The nuts E and E' are first loosened and then the cap C' is loosened to the extent of about two turns, the lock-nut D having been previously removed or the set-screw $c^2$ released. The cap C' is now held in its raised position and the nut E being turned down onto the same, following the threads on the stem B' of the plug, the latter will be lifted from its seat in the casing A.

For opening or closing the plug-cock I preferably employ a lever F, (shown in Figs. 1 and 2,) this lever being adapted to the squared end of the plug-stem B' and preferably forming a part of the structure, being secured to the stem B' by means of a set-screw $f$. Carried by the lever is a gage or indicator plate F', provided with suitable marks or other indicating means to show the position of the opening $b$ in the plug B when the latter is turned with relation to the passage through the casing A. This indicator-plate is curved, as shown, and extends almost to the casing A. The upper angle of the hexagonal end of the casing is used as the fixed point to read the position of the opening $b$ in the plug in connection with the indicator-plate F'. By the use of this indicator in connection with the lever for turning the plug-cock the latter may be opened any predetermined distance and the position of the opening in the plug may be known at all times. As a further means of indicating the position of the opening in the plug the top of the stem B' is grooved at $b^2$, as shown in Fig. 2.

As the use of such a plug forming the subject of my invention only demands that it be open or shut or arranged at some predetermined point between these two positions, I provide means for preventing the plug from moving beyond its desired extreme positions should the plug be located at an obscure point—for instance, in a well in connection with a water or gas pipe. For this purpose I provide the plug B with a pin $d$, adapted to a groove $g$ in the neck A' of the casing A, extending around one-quarter of the internal periphery of the neck. When the pin $d$, carried by the plug, is at one end of the groove $g$, the cock is open, and when at the other end of said groove the cock is closed. In Figs. 4 and 5 I have shown a modification of this arrangement in which a pin $d'$ is carried by the lower end of the plug and is adapted to a groove $g'$ in the bottom of the seat $a$ for the plug.

The cap C', lock-nut D, and the nuts E and E' are all provided with notches $x$, whereby they may be turned by means of the ordinary hooked spanners. This arrangement is not essential, however, as these parts may be made of hexagonal form.

The nuts E and E' fill the space between the cap C' and the lever F and entirely cover the threads on the stem B' of the plug, preserving said threads from injury and preventing the access of dirt and dust to the cock around the stem of the plug.

Having thus described my invention, I claim and desire to secure by Letters Patent—

1. The combination in a plug-cock, of a casing having a seat, a plug adapted to said casing, said plug fitting the seat and having an opening, a threaded stem and a shoulder, a washer adapted to said shoulder, a loose wearing-plate and a stationary compression-ring for the washer, a screw-cap adapted to the neck of the casing for holding these parts in place and thereby securing the plug to its seat, means for locking said screw-cap against accidental displacement, means carried by the threaded stem above the screw-cap for preventing the jamming of the plug in its seat, and a lock for such retaining means.

2. The combination in a plug-cock, of a casing having a seat, a plug adapted to said casing, said plug fitting the seat and having an opening, a threaded stem and a shoulder, a washer adapted to said shoulder, a loose wearing-plate and a compression-ring for the washer, a screw-cap adapted to the neck of the casing for holding these parts in place and securing the plug to its seat, and means carried by the threaded stem above the screw-cap for preventing the jamming of the plug in its seat, said means comprising a plurality of elements which may be adjusted and locked to said stem, substantially as described.

3. The combination in a plug-cock, of the casing having a seat, a plug adapted to said seat and having an opening, a threaded stem and a shoulder, a washer adapted to said stem, a wearing-ring and a compression-ring for the washer, a screw-cap adapted to the neck of the casing for holding these parts in place and securing the plug to its seat, means for locking said screw-cap against accidental displacement, coacting means carried by the plug and casing and located wholly within the latter for limiting the rotative movement of the plug, means carried by the threaded stem of the plug and bearing upon the screw-cap for preventing the jamming of the latter in its seat, and a lock for such retaining means.

4. The combination in a plug-cock, of an integral casing having a seat, a plug conforming to the internal contour of and rotatable within said casing, said plug having a through-opening, a threaded stem and a shoulder, a screw-cap adapted to the neck of the casing, a washer, a loose wearing-plate and a compression-ring interposed between the shoulder of the plug and said screw-cap, the latter serving to hold said parts in place and secure the plug to its seat, means adapted to the casing proper for locking said screw-cap against accidental displacement, and means carried by the threaded stem above the screw-cap for preventing the jamming of the plug in its seat.

In testimony whereof I have signed my name to this specification in the presence of two subscribing witnesses.

LAMBERT J. BORDO.

Witnesses:
K. A. LITTLE,
MURRAY C. BOYER.